United States Patent [19]

Scragg

[11] 4,204,557
[45] May 27, 1980

[54] FLUID FLOW CONTROL VALVE

[76] Inventor: Edgar P. Scragg, 60 Mulder St., Florida Park Extn. 3, Transvaal, South Africa

[21] Appl. No.: 883,977

[22] Filed: Mar. 6, 1978

[30] Foreign Application Priority Data

Mar. 11, 1977 [GB] United Kingdom .............. 10368/77

[51] Int. Cl.² ............................................. E16K 21/06
[52] U.S. Cl. .................................... 137/244; 239/123; 239/562; 251/45
[58] Field of Search ................ 137/242, 244; 431/123; 239/116, 117, 123; 222/149; 251/45

[56] References Cited

U.S. PATENT DOCUMENTS

| | | | |
|---|---|---|---|
| 2,154,811 | 4/1939 | Goss | 137/244 X |
| 2,181,581 | 11/1939 | Fraser | 137/244 |
| 2,833,300 | 5/1958 | Sirotek | 137/244 |
| 3,111,271 | 11/1963 | Lofgren | 239/117 X |
| 3,752,174 | 8/1973 | Turolla | 137/244 X |
| 4,022,380 | 5/1977 | Scragg | 239/68 |
| 4,059,127 | 11/1977 | Olson | 137/244 |

Primary Examiner—Martin P. Schwadron
Assistant Examiner—Richard Gerard
Attorney, Agent, or Firm—Ladas, Parry, von Gehr, Goldsmith & Deschamps

[57] ABSTRACT

The invention relates to a fluid flow control valve of the type in which flow through the valve is controlled by movement of a chamber wall caused by fluid flowing into the chamber through a restricted inlet and a cleaning element is provided to clean the inlet. In this invention, the cleaning element is longer than the restricted inlet and is movable between a first position in which it does not extend through the restricted inlet and a second position in which it extends completely through the restricted inlet. The cleaning element is a rod-like element of self-supporting flexible synthetic plastics material and has a limited inherent rigidity enabling it to force dirt and scale from the restricted inlet.

11 Claims, 2 Drawing Figures

FLUID FLOW CONTROL VALVE

FIELD OF THE INVENTION

This invention relates to a fluid flow control valve of the type in which flow through the valve is controlled by movement of a chamber wall caused by fluid flowing through a restricted inlet into the chamber.

BACKGROUND OF THE INVENTION

In his U.S. Pat. No. 4,022,380, the applicant discloses a fluid flow control valve comprising a casing, an inlet to the casing, an outlet from the casing, a chamber having a movable wall part and a fixed wall part, a restricted inlet to the chamber through one of said wall parts, said restricted inlet communicating with the inlet to the casing. An elongate cleaning element is provided for clearing dirt and scale from said restricted inlet. A valve element normally closes an outlet from said chamber. Actuating means are provided for displacing both said cleaning element and said valve element whereby said cleaning element moves in said restricted inlet to the chamber and said outlet from the chamber is opened to permit liquid to flow from said chamber and allow said movable wall part to move in the direction which reduces the volume of said chamber. A valve seat and co-operating valve surface for controlling flow from said inlet of the casing to said outlet of the casing are arranged to separate upon said movable wall part moving in said direction.

In a preferred form, the movable wall part comprises a frusto-conical diaphragm exposed internally to pressure within the chamber and externally to pressure in the casing, a plate within the chamber, said plate being secured to said diaphragm at a central region of the diaphragm and having a frusto-conical shape commensurate with the shape that the diaphragm adopts while the valve outlet is closed so that, while the valve outlet is closed, the plate is in face-to-face contact with the inner surface of the diaphragm over substantially the whole area of the diaphragm, said diaphragm having freedom to move from said position it adopts when the valve is closed to a position in which the conical angle is essentially reversed.

Experiments have shown that, when the valve is closed, the plate engages and supports virtually the entire area of the diaphragm. In these conditions it can be considered to be a rigid wall. As the valve opens, the plate and disphragm separate, the conical angle of the plate remaining the same and the conical angle of the diaphragm reducing. During closing the plate and diaphragm return to their face-to-face condition. During the initial closing movement it is only the central region of the diaphragm and plate which are in engagement. The diameter over which the plate and diaphragm are in engagement progressively increases during closing and, at closing, there is full face-to-face contact. Applicant's experiments have shown that water between the plate and diaphragm must be forced out of this region through the annular gap which exists between the periphery of the plate and the diaphragm. This gap is narrow and a 'squeezing' action must be exerted on the water to expel it. This in itself leads to some resistance to closing with an immediate reduction in the possibility of water hammer being created. Another important factor in resisting the creation of water hammer is that as the valve approaches its closed condition virtually the entire area of the diaphragm is supported. It consequently cannot flex inwardly should the central portion suddenly be sucked into its seat. Thus although there is certainly a tendency to suck the valve onto its seat this must of necessity lead to an increase in the volume of the chamber. As the diaphragm is prevented from flexing inwardly to compensate for the tendency of the chamber to increase in volume, an internal suction effect is created within the chamber whcih prevents the valve snapping shut under the suction effect of the flowing water.

In initial production samples, rigid metal cleaning elements carried by stems fixed to the valve element were used to clean the restricted inlet to the chamber. These elements were normally outside the opening and moved into and through the opening in use. In order to ensure that the valves seated accurately and that the movable wall part moved without undue interference, distortion or twisting, it was found to be desirable accurately to align the cleaning element with the restricted inlet, with the need for increased manufacturing accuracy. A misaligned rigid cleaning element could enter the restricted inlet and twist or distort the movable part slightly, particularly when a diaphragm and plate were used. Then, apart from slight sticking of the element in the restricted inlet, the element could be rapidly returned to its misaligned state by resilience in the movable wall part on leaving the restricted inlet with a resulting rapid movement of the movable wall part. This, together with the increase in flow area when the element leaves the restricted inlet, could lead to slight water hammer. The metal elements can also scratch and gouge the interior of the opening in many cases, resulting in inaccurate metering.

It is an object of the invention to further improve fluid flow control valves from a point of view of reducing both water hammer and the degree of accuracy required in manufacture.

SUMMARY OF THE INVENTION

According to the invention there is provided a fluid flow control valve comprising a casing, an inlet to the casing, an outlet from the casing, a chamber having a movable wall part and a fixed wall part, a restricted inlet to the chamber through one of said wall parts, said restricted inlet communicating with the inlet to the casing, an elongate cleaning element for clearing dirt and scale from said restricted inlet, an outlet from said chamber, a valve element normally closing said outlet from said chamber, actuating means for displacing both said cleaning element and said valve element whereby said cleaning element moves in said restricted inlet to the chamber and said outlet from the chamber is opened to permit liquid to flow from said chamber and allow said movable wall part to move in the direction which reduces the volume of said chamber, and a valve seat and co-operating valve surface for controlling flow from said inlet of the casing to said outlet of the casing, said seat and surface being arranged to separate upon said movable wall part moving in said direction, wherein the cleaning element is longer than the restricted inlet and is movable between a first position in which it does not extend through the restricted inlet and a second position in which it extends completely through the restricted inlet, and wherein the cleaning element is a rod-like element of self-supporting flexible synthetic plastics material and has a limited inherent rigidity enabling it to force dirt and scale from the restricted inlet.

The invention is particularly applicable to the preferred form of valve referred to above.

In order to ensure that distortion of the movable part by the action of the cleaning element is insignificant in practice, the element should be sufficiently flexible effectively to snake through the restricted inlet. For this purpose, the cleaning element preferably extends from a stem uniting the cleaning element and the valve element, the cleaning element and stem being cylindrical and co-axial and the cleaning element having a diameter less than about a third of the diameter of the stem whereby the stem is relatively rigid compared with the cleaning element and the cleaning element will bend without significantly bending the stem. The valve element and cleaning element may be moulded integrally with one another.

The movable wall part may have a central boss forming a spring seat and a spring can then act between the spring seat and the valve element for biassing the valve element to close the outlet from the chamber. The stem preferably extends through an opening in the boss and has an outer portion projecting away from the boss towards the restricted inlet when the valve outlet is closed, the cleaning element having a length greater than the length of the outer portion of the stem.

In order to ensure substantially consistent metering of liquid flowing through the restricted inlet, said cleaning element is preferably guided within said restricted inlet at all times so that said cleaning element moves with respect to said restricted inlet when the cleaning element is displaced by said actuating means but never leaves the restricted inlet. The flow area through the restricted inlet is thus provided by a gap at least partly encircling part of the cleaning element.

BRIEF DESCRIPTION OF THE DRAWING

For a better understanding of the present invention reference will now be made, by way of example, to the accompanying drawing, in which.

DESCRIPTION OF THE PREFERRED EMBODIMENT

Figure 2:
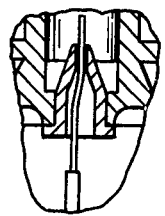
FIG. 2 shows part of such a valve in an alternative position.
Figure 1:
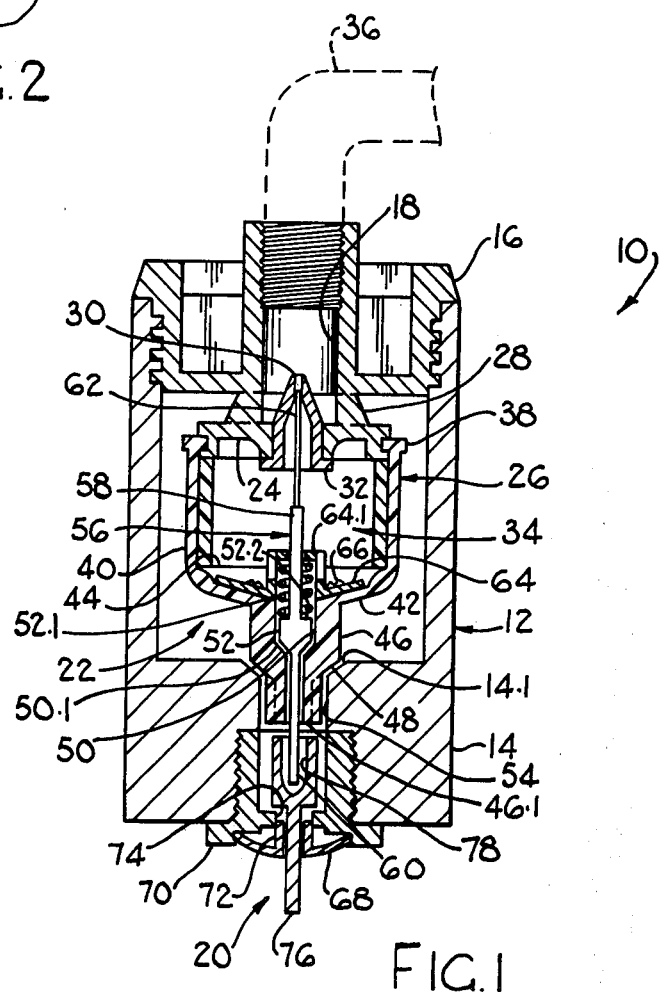
FIG. 1 is a vertical section through a fluid flow control valve.

The fluid flow control valve illustrated is generally referenced 10 and comprises a casing 12 composed of a cylindrical body 14 to which is fitted an upper end cap 16. The upper end cap has an inlet passage 18 to the casing 12.

An actuating means 20 serves to open the valve and the structure generally indicated at 22 is the closing mechanism. The closing mechanism 22 includes an upper component 24 and a cup-shaped component 26. The upper component 24 is integrally moulded with the cap 16 and is connected thereto by an array of spaced ribs 28. Passages between the ribs connect the inlet passage 18 to an annular chamber defined by the body 14. A restricted inlet 30, referred to subsequently as a jet, extends axially through a jet insert 32 and serves to connect the inlet passage 18 to a chamber 34 which is bounded by the components 24 and 26. The jet insert 32 is a press-fit in a bore in the upper component 24. The insert 32 is generally cone-shaped with a fine bore constituting the jet 30 at its apex. By way of example, the bore can have a diameter of 0.030" and a length of 3/16".

The inlet passage 18 is threaded to enable it to receive an inlet pipe diagrammatically shown at 36.

The cup-shaped component 26 is preferably a rubber moulding. Around the rim of the component 26 there is a rib 38 entered in a peripheral groove of the component 24. Internally of the moulding, between its wall 40 and a shallowly frusto-conical, flexible diaphragm 43, there is a circumferentially extending strengthening fillet 44. Because of the frusto-conical nature of the diaphragm 42, the centre region of the cup-shaped component 26 is deeper than the region adjacent its side wall 40. A stem 46 extends downwardly from the diaphragm 42. The stem 46 has thereon an external surface 48, in a stepped vertical passage 50 thereof, has a seat 50.1 for a valve closure element 52. The part 46.1 of the stem 46 which is within the outlet passage 54 of the body 14 is formed with axially extending ribs between which there are flow channels. The surface 48 co-operates with a valve seat 14.1 which is constituted by a surface of the body 14.

A substantially rigid plastics sleeve is in force fit in the wall 40 and serves to prevent the wall from collapsing or flexing significantly under pressure.

The valve element 52 forms part of a moulding 56 of self-supporting flexible synthetic plastics material. The moulding includes upper and lower rod-like parts or stems 58 and 60. The rod-like part or stem 58 has at its upper end a cleaning element 62 which is moulded integrally with the part 58 and the rod-like part 60 extends downwardly through the passage 50.

A shallowly frusto-conical strengthening plate 64 having a central boss 64.1 is secured by screws 66 to the component 26. The screws enter the stem 46 from above. The plate has a frusto-conical shape commensurate with the shape that the diaphragm 42 adopts while the valve outlet passage 54 is closed so that, while the valve outlet passage is closed, the plate is in face-to-face contact with the inner surface of the diaphragm over a substantial area of the diaphragm, said diaphragm having freedom to move from said position it adopts when the passage 54 is closed to a position in which the conical angle is essentially reversed. The plate 64 is, compared with the diaphragm 42, non-flexible. A small coil spring 52.1 encircles the element 52 and is within the boss 64.1. This spring acts between the top wall of the boss 64.1 and a shoulder 52.2 of the element 52.

The cleaning element 62 is longer than the restricted opening and is movable between a first position in which it is within but almost clear of the restricted inlet and a second position (FIG. 2) in which it extends completely through the restricted opening. For example, the tip of the element 62, in its lower position, can be just in the jet 30 and can have a displacement of ⅜". Thus the element passes entirely through the jet 30 each time that the valve operates. It has a limited inherent rigidity enabling it, if misaligned, to bend and snake through the restricted inlet as shown in exaggerated form in FIG. 2 and also to force dirt and scale from the restricted inlet and to prevent scale from accumulating. The flow area through the restricted inlet is provided by an annular gap between the cleaning element and the wall of the restricted inlet and encircles the element 62. As the element 62 never leaves the inlet the flow area does not change noticeably.

A multi-apertured shower rose is referenced 68 and is carried by a body 70 which is screwed into the lower end of the body 14. A central boss 72 of the rose 68 is a press-fit in the bore of a spider 74 of the body 70. An actuating member, referenced 76, passes through the boss 72 and, above the spider 74, has an enlarged upper end in which there is an upwardly open blind bore 78. The part 60 is a loose fit in the bore 78.

In the closed condition of the valve, the valve surface 48 is in engagement with the seat 14.1 and the element 52 is on its seat 50.1. In the drawing these various components are spaced but this is merely to facilitate illustration. The upper end of the member 76 is spaced from the stem 46.

The interior of the cylindrical casing 14 is subjected to full mains pressure and this pressure acts on both sides of the diaphragm 42. Immediately the element 52 is lifted against the action of the spring 52.1, the outlet from the chamber 34 is opened so that the pressure therein drops. The wall 40 remains in the condition illustrated and the centre part of the diaphragm 42 moves upward to lift the stem 46 so that the valve surface 48 moves away from the seat 14.1. Water then commences to flow from the inlet passage 18 through the bores 28 to the main chamber of the valve, and through the passage 54 of the body 14 to the valve outlet.

When the moulding 56 is lifted, the cleaning element 62 is guided through the jet 30 and clears any dirt which has lodged in the vicinity thereof or any scale which has been deposited. Hence the actuating member 76 has the dual function of simultaneously displacing both the element 62 and the valve element 52.

The distance between the lower end of the actuating member 76 and the rose 68 determines the distance through which the moulding 56, and hence the element 52, can be raised. Furthermore, this gap is greater than the gap between the top of the member 76 and the lower end of the stem 46. Thus, after the element 52 has been lifted from its seat 50.1, the member 76 engages the stem 46 and forces it, and hence the central part of the diaphragm 42, upwardly thereby forcing water to flow from the chamber 34.

As a consequence, reliance is not placed solely on inlet pressure to obtain movement of the diaphragm 42 and the valve is capable of operating on low inlet pressures eg 4 p.s.i.

The element 52 is only unseated for a short while, the member 76 being released immediately after operation. The spring 52.1 re-seats the element 52 immediately the element 76 is released. The outlet passage 50 from the chamber 34 is thus closed and the chamber begins to refill, water flowing into it through the jet 30. As the chamber fills, the diaphragm 42 moves downwardly and eventually the surface 48 re-engages the seat 14.1 to close the valve.

The diaphragm 42 flexes along a circular line between the fillet 44 (which remains stationary) and the stem 46. Thus, during opening and closing movements of the valve, the stem 46 and the part of the diaphragm 42 immediately outwardly thereof rise and fall, the outer part of the diaphragm 42, the fillet 44 and the wall 40 remaining virtually stationary. The plate 64 rises and falls with the stem 46 and thus, during opening, its outer part lifts away from the diaphragm 42. The function of this plate is to inhibit inward collapse of any peripheral part of the moulding in the region of the fillet 44.

An additional function of the plate 64 is to trap water between itself and the diaphragm 42 when the valve is in its open condition. As the valve closes, more and more of the area of the diaphragm comes into face-to-face contact with the plate and the water between these two components is 'squeezed' out. This has a retarding effect on the movement of the diaphragm 42.

I claim:

1. A fluid flow control valve comprising a casing, an inlet to the casing, an outlet from the casing, a chamber having a movable wall part and a fixed wall part, a restricted inlet to the chamber through one of said wall parts, said restricted inlet communicating with the inlet to the casing, an elongate cleaning element for clearing dirt and scale from said restricted inlet, an outlet from said chamber, a valve element normally closing said outlet from said chamber, actuating means for displacing both said cleaning element and said valve element whereby said cleaning element moves in said restricted inlet to the chamber and said outlet from the chamber is opened to permit liquid to flow from said chamber and allow said movable wall part to move in the direction which reduces the volume of said chamber, and a valve seat and co-operating valve surface for controlling flow from said inlet of the casing to said outlet of the casing, said seat and surface being arranged to separate upon said movable wall part moving in said direction, wherein the cleaning element is longer than the restricted inlet and is movable between a first position in which it does not extend through the restricted inlet and a second position in which it extends completely through the restricted inlet, and wherein the cleaning element is a rod-like element of self-supporting flexible synthetic plastics material and has a limited inherent rigidity enabling it to force dirt and scale from the restricted inlet.

2. The valve of claim 1, wherein the movable wall part comprises a frusto-conical diaphragm exposed internally to pressure within the chamber and externally to pressure in the casing, a plate within the chamber, said plate being secured to said diaphragm at a central region of the diaphragm and having a frusto-conical shape commensurate with the shape that the diaphragm adopts while the valve outlet is closed so that, while the valve outlet is closed, the plate is in face-to-face contact with the inner surface of the diaphragm over a substantial area of the diaphragm, said diaphragm having freedom to move from said position it adopts when the valve outlet is closed to a position in which the conical angle is essentially reversed.

3. The valve of claim 2, wherein the chamber includes a cup-like component secured to said fixed wall part, said component having a base forming said diaphragm and a side wall extending generally between said fixed wall part and said base, and wherein a reinforcing sleeve is fitted snugly within said side wall to restrict flexing of the said wall.

4. The valve of claim 2, wherein the valve element and the cleaning element are moulded integrally with one another.

5. The valve of claim 1, wherein the cleaning element extends from a stem uniting the cleaning element and the valve element, the cleaning element and stem being cylindrical and co-axial and the cleaning element having a diameter less than about a third of the diameter of the stem whereby the stem is relatively rigid compared with the cleaning element and the cleaning element will bend without significantly bending the stem.

6. The valve of claim 5, wherein the movable wall part has a central boss forming a spring seat and a spring acts between the spring seat and the valve element for biassing the valve element to close the outlet from the chamber.

7. The valve of claim 6, wherein the stem extends through an opening in the boss and has an outer portion projecting away from the boss towards the restricted opening when the valve outlet is closed, the cleaning element having a length greater than the length of the outer portion of the stem.

8. The valve of claim 1, wherein the cleaning element is continuously within said restricted inlet and the flow area through the restricted inlet is provided by a gap at least partly encircling part of the cleaning element.

9. A fluid flow control valve comprising a casing; an inlet to the casing; an outlet from the casing; a chamber having a movable wall part and a fixed wall part, the movable wall part comprising a frusto-conical diaphragm exposed internally to pressure within the chamber and externally to pressure in the casing, said diaphragm having freedom to move from said position it adopts when the valve outlet is closed to a position in which the conical angle is essentially reversed; a plate within the chamber, said plate being secured to said diaphragm at a central region of the diaphragm and having a frusto-conical shape commensurate with the shape that the diaphragm adopts while the valve outlet is closed so that, while the valve outlet is closed, the plate is in face-to-face contact with the inner surface of the diaphragm over a substantial area of the diaphragm; a restricted inlet to the chamber through one of said wall parts and partly defining a flow path, said restricted inlet communicating with the inlet to the casing; an outlet from said chamber; a valve element normally closing said outlet from said chamber; actuating means for displacing said valve element whereby said outlet from the chamber is opened to permit liquid to flow from said chamber and allow said movable wall part to move in the direction which reduces the volume of said chamber; a valve seat and co-operating valve surface for controlling flow from said inlet of the casing to said outlet of the casing, said seat and surface being arranged to separate upon said movable wall part moving in said direction; and an elongate cleaning element movable by said actuating means for clearing dirt and scale from said restricted inlet, said cleaning element being longer than the restricted inlet and movable between a first position in which it extends into the restricted inlet and a second position in which it extends completely through the restricted inlet whereby said cleaning element is continuously in said restricted inlet, said cleaning element being a rod-like element of self-supporting flexible synthetic plastics material and having a limited inherent rigidity enabling it to force dirt and scale from the restricted inlet; said flow path being provided by a gap in the restricted inlet and at least partly encircling part of said cleaning element.

10. The valve of claim 9, wherein the valve element and the cleaning element are moulded integrally with one another and the cleaning element extends from a stem uniting the cleaning element and the valve element, the cleaning element and stem being cylindrical and co-axial and the cleaning element having a diameter less than about a third of the diameter of the stem whereby the stem is relatively rigid compared with the cleaning element and the cleaning element will bend without significantly bending the stem.

11. The valve of claim 10, wherein the movable wall part has a central boss forming a spring seat, wherein a spring acts between the spring seat and the valve element for biassing the valve element to close the outlet from the chamber, and wherein the stem extends through an opening in the boss and has an outer portion projecting away from the boss towards the restricted opening when the valve outlet is closed, the cleaning element having a length greater than the length of the outer portion of the stem.

* * * * *